United States Patent [19]

McKnight et al.

[11] Patent Number: 4,831,604

[45] Date of Patent: May 16, 1989

[54] ULTRASONIC RANGE FINDING

[75] Inventors: James A. McKnight, Altrincham; Leslie M. Barrett, Warrington, both of England

[73] Assignee: United Kingdom Atomic Energy Authority, London, England

[21] Appl. No.: 840,148

[22] Filed: Mar. 17, 1986

[30] Foreign Application Priority Data

Apr. 12, 1985 [GB] United Kingdom ............... 8509447
Apr. 12, 1985 [GB] United Kingdom ............... 8509445

[51] Int. Cl.$^4$ ............................................. G01V 15/08
[52] U.S. Cl. ........................................ 367/99; 367/108
[58] Field of Search ................ 367/99, 108, 35, 100, 367/124, 125, 127, 137; 342/127

[56] References Cited

U.S. PATENT DOCUMENTS

| | | | |
|---|---|---|---|
| 3,181,114 | 4/1965 | Hallmark | 367/95 |
| 3,298,024 | 1/1967 | Bohm | 342/127 |
| 3,517,767 | 6/1970 | Straus et al. | 367/35 |
| 3,555,500 | 1/1971 | Longerich et al. | 367/137 |
| 3,934,457 | 1/1976 | Clark et al. | 376/249 |
| 4,287,769 | 9/1981 | Buckley | 73/627 |
| 4,376,990 | 3/1983 | Metchev | 367/95 |
| 4,493,849 | 1/1985 | Carroll et al. | 426/3 |
| 4,494,224 | 1/1985 | Morrell et al. | 367/99 |
| 4,521,162 | 6/1985 | Parkinson | 417/138 |
| 4,574,368 | 3/1986 | Lipschutz | 367/108 |
| 4,752,435 | 6/1988 | Fenemore et al. | 376/249 |

FOREIGN PATENT DOCUMENTS 0017744 10/1980 European Pat. Off. .
2423034 9/1979 France .
2017300 10/1979 United Kingdom .

OTHER PUBLICATIONS

Hans et al., Liquid Metal Engineering and Technology, 1984, pp. 419-421.

Primary Examiner—Thomas H. Tarcza
Assistant Examiner—Daniel T. Pihulic
Attorney, Agent, or Firm—William R. Hinds

[57] ABSTRACT

Range finding equipment is employed in a nuclear reactor to monitor the spacing between structural components (22, 24) of the reactor which are under stress. A manipulator (32) carries a pair of send-receive ultrasonic transducers (30) arranged back to back so as to direct ultrasound signals towards reflectors (26, 28) associated with the structural components to be monitored. The transducers are pulsed with signals derived by gating a few cycles of a sustained reference signal of sine wave form and the resulting echo signals can be used to provide transit time and phase displacement information from which the spacing between the relectors (26, 28) can be derived with a high degree of precision.

15 Claims, 2 Drawing Sheets

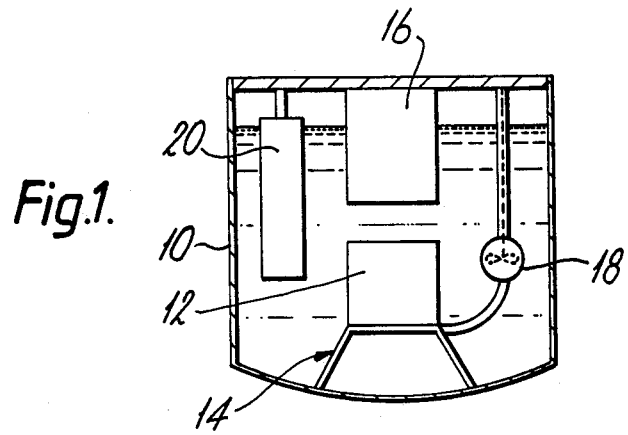
Fig.1.
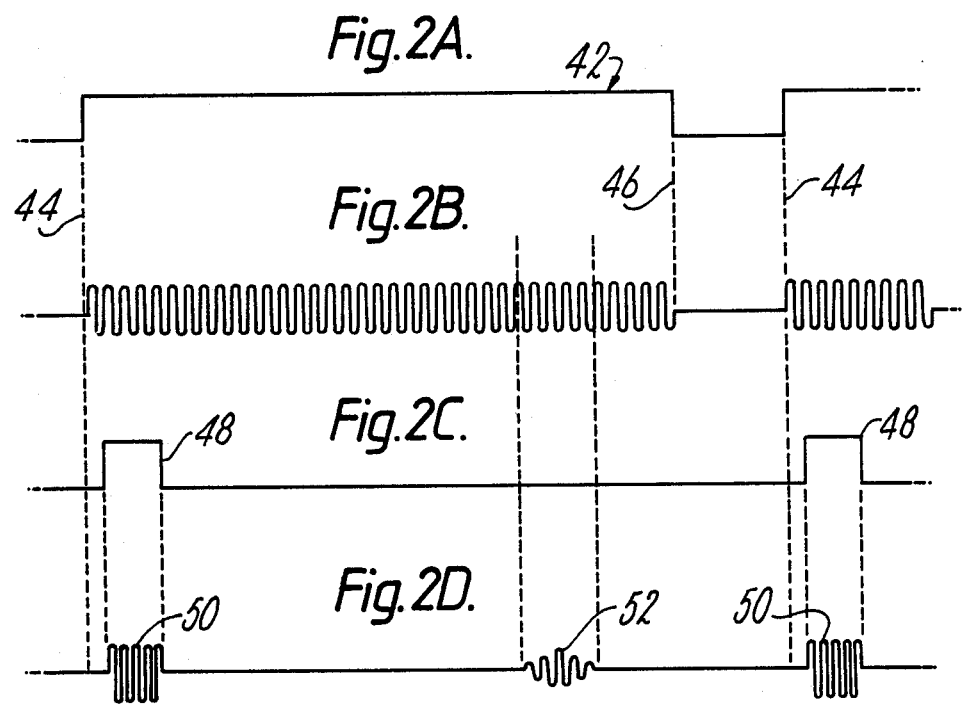
Fig.2A.
Fig.2B.
Fig.2C.
Fig.2D.

ULTRASONIC RANGE FINDING

BACKGROUND OF THE INVENTION

This invention relates to ultrasonic range finding.

It is well-known to measure range by measuring the transit time taken for an ultrasound pulse to travel to and return from a target. It is also known to employ a phase measuring method, as described in "Ultrasonic Testing of Materials" (J and H Krautkramer), Third Edition, Page 286. The known phase measuring method involves the use of continuous waves of constant frequency and comparing the phase displacement of the echo with respect to the transmitted signal. This necessarily entails the use of separate transmitters and receivers and, in addition, if the range is greater than one wavelength, the approximate distance must be known.

FEATURES AND ASPECTS OF THE INVENTION

The object of the present invention is to provide an improved method and apparatus for ultrasonic range finding.

According to one aspect of the present invention there is provided a method of ultrasonic range finding of a target comprising the steps of: generating a sustained reference signal having a periodic waveform; extracting a portion of the reference signal and applying it to transducer means so as to produce an ultrasound pulse which is directed towards said target; receiving the echo signal returned by the target; determining the pulse echo transit time and the phase displacement of the echo signal with respect to the reference signal; and combining the transit time and phase displacement information to derive a measure of the range of the target.

Preferably the same transducer is used to send and receive the pulse and echo signals.

According to a second aspect of the invention there is provided range finding apparatus comprising: means for generating a sustained reference signal having a periodic waveform; means for gating said reference signal and applying the gated signal portion to ultrasonic transducer means so that the latter produces a pulsed ultrasound output; means for determining the pulse-echo transit time; means for determining the phase displacement of the echo signal with respect to the reference signal; and means for combining the phase displacement and transit time information to derive a measure of range.

One application of the invention is in the measurement of displacements between stressed structural components within a nuclear reactor as described hereinafter.

DESCRIPTION OF THE DRAWINGS

The invention will now be described by way of example only with reference to the accompanying drawings, in which:

FIG. 1 is a diagrammatic view illustrating the general layout of a pool-type liquid metal cooled fast breeder reactor;

FIG. 2A-2D illustrate various waveforms;

DESCRIPTION OF PREFERRED EMBODIMENT

Figure 4:
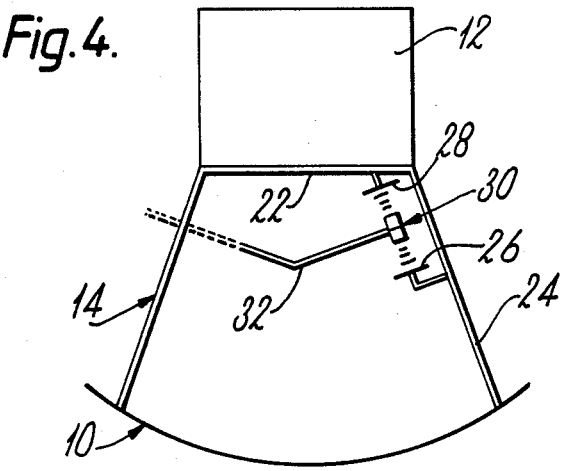
FIG. 4 is a diagrammatic view illustrating the measurement of any displacement between components of the core support structure in a reactor.

Referring to FIG. 1 the reactor, as illustrated diagrammatically, comprises a reactor vessel 10 provided with a core 12 mounted on support structure 14 beneath the above-core structure 16 (incorporating control rods etc). The reactor also includes the usual liquid metal pumps 18 and heat exchangers 20. There is a need for the support structure to be examined on a regular routine basis to detect any relative movements between those components of the structure which are subject to stress. Thus, for example, as shown in FIG. 4, the structural components 22, 24 may be routinely inspected for such displacement.

Such inspections can be carried out by ultrasonically measuring the spacing between the components 22, 24 or, more particularly, between reflectors 26, 28 attached to the components and comparing with previously made measurements to detect any variation with time. This can be achieved by positioning an ultrasonic transducer assembly 30 between the reflectors 26, 28, the assembly comprising a pair of transducers located back to back so that they emit ultrasound in opposite directions. The transducer assembly 30 is positioned by means of a manipulator device 32 which may comprise a series of interconnected links insertable into a reactor via a vertical mast (not shown) extending through the reactor roof, the links being so designed that the manipulator is flexible in one direction and rigid in the opposite direction so that it can be extended in the manner of a cantilever arm.

A links manipulator of this type is described for example in Liquid Metal Engineering and Technology, British Nuclear Engineering Society 1984, Pages 423-430, the article being entitled "Recent advances in the technology of under-sodium inspection in LMFBRs" by McKnight et al. The manipulator may include an articulated joint or joints to enable the assembly 30 to be orientated such that the ultrasound beams emitted by the transducers are incident at substantially 90° on the reflector plates 26, 28. The optimum orientation of the transducer assembly may be obtained by adjusting the manipulator until the echo signals from the reflectors are maximised. As will be explained hereinafter the actual location of the transducer assembly 30 between the reflectors 26, 28 is not important in terms of obtaining accurate measurement of the distance between the reflectors. It is more important that the transducers are orientated for 90° incidence on the reflectors. The latter consideration may be less significant if, instead of being flat as illustrated in FIG. 4, the reflectors 26, 28 are spherical but, in this event, the location of the assembly 30 between the reflectors may be more important because of the desirability of locating each transducer at the centre of curvature of the associated reflector.

Figure 3:
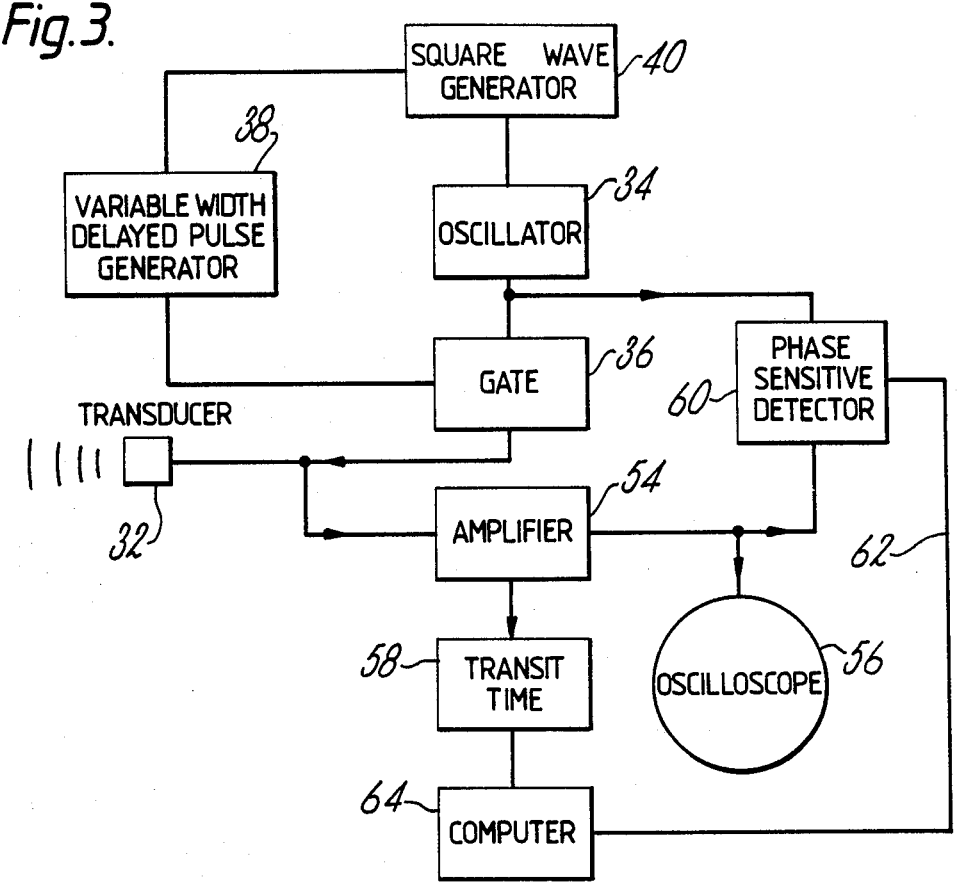
FIG. 3 is a schematic block diagram of electronic circuitry for driving an ultrasonic transducer and deriving distance measurements from the reflected ultrasound.

Referring to FIG. 3, this illustrates the electronic circuitry associated with each transducer 32 of the assembly 30. The transducer 32 is of the send-receive type and is connected to a high frequency oscillator 34 (typically 5 MHz) via a gate 36 whose width is controlled by circuit 38 which enables the width to be varied if desired. The oscillator 34 is controlled by a square wave generator 40 so that the output of the oscillator is delivered in bursts governed by the mark-space ratio of the generator 40. Thus, as shown in FIGS. 2A and 2B, the square wave output 42 of the generator 40 defines the start 44 and end 46 of the oscillator signal bursts which may be sinusoidal. The width of each burst is selected so as to be in excess of the time taken for a transmitted pulse from the transducer 32 to travel out to its associated reflector and back again.

The oscillator bursts are gated by gate 36, the gate pulses being depicted by reference numeral 48 in FIG. 2C. The gate pulses 48 may be delayed slightly with respect to the leading edges of the square wave 42 but will be arranged so that both the gated pulse and the echo fall within the same signal burst from the oscillator 34 and preferably so that the leading edge of the gate pulse coincides with a predetermined point on the reference signal waveform (preferably the zero cross-over is used since the result of gating at this point will result in the gated portion having a harmonic content which can be transmitted by the transducer). The gate 36 serves to isolate a few cycles of the signal burst and apply the gated portion 50 (see FIG. 2D) to the transducer 32 which then generates a pulse of ultrasound in phase with the oscillator 34. It will be understood that the oscillator output serves as a reference signal for detection of phase differences between the reference and the echo. The echo signals, depicted by reference numeral 52 in FIG. 2D, are fed from the transducer 32 via an amplifier 54 to an oscilloscope 56, transit time circuitry 58 and a phase sensitive detector 60 which also receives the reference signals from the oscillator 34 and serves to produce a signal on line 62 representing the phase shift of the echo signal 52 with respect to the reference signal.

The output of detector 60 and transit time circuitry 58 are fed to a computer 64 which combines the coarse distance measurement represented by the pulse transit time with the fine measurement obtained from the detector 60 to derive a high precision result with a typical accuracy of the order of a small fraction of a wavelength (of the oscillator signal). The range of the target, i.e. the associated reflector, may be stored in terms of a time measurement or it may be converted to a distance measurement as such by multiplying the time by the velocity of sound in the medium (e.g. liquid sodium). An indication of the perpendicular spacing (either in terms of time or distance) between the reflectors may then be derived by summing the measurements made by both transducers, it will be understood that the overall result will be independent of the precise position of the transducer assembly 30 between the two reflectors.

Although, in the illustrated embodiment, a send-receive transducer is associated with each reflector, separate transmitting and receiving transducers may be used instead.

Prior to effecting measurement of the spacing between the reflectors, a calibration procedure may be carried out in the same environment. The calibration may be achieved by positioning the assembly 30 between two reflectors secured to reactor internals which are unstressed, the reflectors being located a precise, known distance apart. The assembly 30 is used to obtain a measurement of this distance thereby enabling the equipment to be calibrated in terms of the known spacing.

We claim:

1. A method of ultrasonic range finding of a target comprising the steps of: generating a sustained reference signal having a periodic waveform; extracting a portion of the reference signal and applying it to transducer means so as to produce an ultrasound pulse which is directed towards said target so that the target returns an echo signal; receiving the echo signal returned by the target; determining the transit time of the pulse to the target and the echo signal received from the target and phase displacement of the received echo signal with respect to the reference signal; and combining the transit time and phase displacement information to derive a measure of the range of the target.

2. A method as claimed in claim 1 in which the extracted portion of the reference signal contains at least one cycle of the reference signal.

3. A method as claimed in claim 1 in which the start of said extracted portion coincides with a predetermined point on the reference signal waveform.

4. A method as claimed in claim 3 in which said predetermined point comprises a zero cross-over point of the reference signal waveform.

5. A method as claimed in claim 1 in which said reference signal is sustained for a sufficient interval of time to embrace the echo signal and is then interrupted.

6. A method as claimed in claim 1 in which the reference signal is sinusoidal.

7. A method as claimed in claim 1 in which the same transducer is used to send and receive the pulse and echo signals.

8. A method of obtaining a measure of the spacing between two spaced components, said method comprising locating ultrasonic transducer means between said components, oppositely directing ultrasonic signals towards both said components (or targets associated therewith), receiving said signals following reflection by said components/targets and analyzing the signals to derive phase displacement and transit time information whereby said signals collectively provide a measure of the spacing between said components, said method further including: generating a sustained reference signal; extracting a portion of the reference signal and applying it to said transducer means to produce ultrasound pulses directed toward said components/targets such that the components/targets return echo signals; receiving the echo signals returned by the components/targets; determining the transit time of each pulse to its component/target and the echo signal received from its component/ target and phase displacement of the echo signals with respect to the reference signal; and combining the transit time and phase displacement information of the oppositely directed signals to derive a measure of said spacing.

9. Range finding apparatus comprising: means for generating a sustained reference signal having a periodic waveform; means for gating said reference signal and applying the gated signal portion to ultrasonic transducer means so that the transducer means produces a pulsed ultrasound output; means for receiving an echo signal returned by a target encountered by said pulsed output; means for determining the transit time of the pulsed output to the target and an echo signal received from the target; means for determining phase displacement of the received echo signal with respect to the reference signal; and means for combining the phase displacement and transit time information to derive a measure of range.

10. Apparatus as claimed in claim 9 in which said gating means produces a gating pulse whose leading edge coincides with a predetermined point on the reference signal waveform.

11. Apparatus as claimed in claim 10 in which said predetermined point comprises a zero cross-over.

12. Apparatus as claimed in claim 9 in which said transducer means is operable in the send-receive mode.

13. Apparatus for obtaining a measure of the spacing between two spaced components, comprising a support carrying ultrasonic transducer means arranged to emit ultrasonic signals in opposite directions whereby the support can be located between said components and each of said signals can be directed towards, and echo signals received from, a respective component, means for generating a sustained reference signal having a periodic waveform, means for gating said reference signal and applying the gated signal portion to said ultrasonic transducer means so that the latter produces pulsed ultrasonic outputs which are reflected as echo signals upon encountering the components, means for determining the transit time of each pulse to its component and the echo signal received from its component, means for determining phase displacement of the echo signals with respect to the reference signal, and means for combining the transit times and phase displacement information of said outputs and echoes to derive a measure of the spacing between said components.

14. Apparatus as claimed in claim 13 in which said support comprises a series of endwise pivotally interconnected links which are capable of being extended in cantilever fashion.

15. Apparatus as claimed in claim 13 in which said support is adjustable to move the transducer means angularly about at least one axis.

* * * * *